US008661048B2

(12) United States Patent
Isakson et al.

(10) Patent No.: US 8,661,048 B2
(45) Date of Patent: Feb. 25, 2014

(54) CRIME INVESTIGATION TOOL AND METHOD UTILIZING DNA EVIDENCE

(75) Inventors: Andrew Patrick Isakson, Gibsonville, NC (US); Brian Walter Meehan, Elon, NC (US)

(73) Assignee: DNA: SI Labs, Inc., Burlington, NC (US)

( * ) Notice: Subject to any disclaimer, the term of this patent is extended or adjusted under 35 U.S.C. 154(b) by 716 days.

(21) Appl. No.: 12/042,835

(22) Filed: Mar. 5, 2008
(Under 37 CFR 1.47)

(65) Prior Publication Data

US 2009/0100030 A1    Apr. 16, 2009

Related U.S. Application Data

(60) Provisional application No. 60/893,013, filed on Mar. 5, 2007.

(51) Int. Cl.
*G06F 7/00*        (2006.01)
*G06F 17/30*      (2006.01)

(52) U.S. Cl.
USPC ............................ 707/758; 707/705; 435/6.11

(58) Field of Classification Search
None
See application file for complete search history.

(56) References Cited

U.S. PATENT DOCUMENTS

| | | | |
|---|---|---|---|
| 6,460,028 B1 * | 10/2002 | Penoyer | 707/999.002 |
| 6,748,399 B1 * | 6/2004 | Kan et al. | 707/999.202 |
| 6,948,066 B2 | 9/2005 | Hind et al. | |
| 7,069,265 B2 | 6/2006 | Kim | |
| 7,237,117 B2 | 6/2007 | Weiss | |
| 7,308,123 B2 | 12/2007 | Fenrich et al. | |
| 7,606,790 B2 * | 10/2009 | Levy | 707/999.003 |
| 2002/0058018 A1 * | 5/2002 | Ford | 424/85.2 |
| 2002/0091907 A1 * | 7/2002 | Pouliot et al. | 712/1 |
| 2003/0134320 A1 * | 7/2003 | Barrus et al. | 702/20 |
| 2003/0182052 A1 * | 9/2003 | DeLorme et al. | 701/201 |
| 2004/0193572 A1 * | 9/2004 | Leary | 707/1 |
| 2004/0225681 A1 * | 11/2004 | Chaney et al. | 707/104.1 |
| 2005/0065736 A1 * | 3/2005 | Bauck et al. | 702/20 |
| 2005/0282197 A1 * | 12/2005 | Foreman et al. | 702/20 |

OTHER PUBLICATIONS

Claerhout et al. (Privacy protection for clinical and genomic data the use of privacy-enhancing techniques in medicine, International Journal of Medical Informatics (2005) 74, 257-265).*

* cited by examiner

*Primary Examiner* — Jau-Shya Meng
(74) *Attorney, Agent, or Firm* — Shumaker, Loop & Kendrick, LLP

(57) ABSTRACT

Crime investigation systems and methods including an investigation tool for receiving and storing DNA information, attaching related case information, disconnecting identification information, matching the information against stored information, and generating and communicating reports of match results, and an interface in communication with the crime investigation tool for entering the related case information, updating the information, and receiving the reports. The systems and methods further provide evidence chain of custody tracking and real time entry and updating from the field.

13 Claims, 7 Drawing Sheets

CRIME INVESTIGATION TOOL AND METHOD UTILIZING DNA EVIDENCE

CROSS REFERENCE TO RELATED APPLICATIONS

This application claims priority to Provisional Application No. 60/893,013 filed Mar. 5, 2007 by Isakson et el. and entitled "Local DNA Identification System," the contents of which are hereby incorporated by reference.

TECHNICAL FIELD AND BACKGROUND OF THE INVENTION

1. Field of the Invention

The present invention relates generally to the field of crime investigation using DNA evidence, and more specifically, to a point of investigation tool and interface, wherein the tool and interface are operable for entering, accessing and updating case, crime scene and DNA information in real time and from the field.

2. Background of the Invention

DNA contains the genetic instructions used in the development and functioning of all known living organisms. DNA is responsible for the long-term storage of information, and often times is compared to a set of blueprints for constructing components of cells, such as proteins. DNA is a long polymer made from millions of units of repeating nucleotides. DNA occurs as chromosomes, and the set of chromosomes in a cell make up its genome. The human genome has approximately 3-billion base pairs of DNA arranged into 46 chromosomes. The information carried by DNA is held in the genes, and the complete set of information in an organism is called the genotype. The gene is the unit of heredity that influences a particular characteristic in an organism, such as hair color or susceptibility to a disease.

DNA is commonly used in a variety of technology fields including, but not limited to, genetic engineering, forensics, bioinformatics, DNA nanotechnology, history and anthropology. It is with respect to forensics that is of particular interest in the present application. Specifically, forensic scientists are able to use the DNA found in blood, saliva, hair, urine, semen, skin and bone, as well as other fluids and body components, found at a crime scene to genetically fingerprint a perpetrator. This is commonly referred to as "DNA profiling," and can be accomplished by comparing the lengths of variable sections of repetitive DNA from a crime scene with those obtained from a suspect. DNA profiling has become a widely accepted method for accurately identifying a perpetrator and aiding in solve crime. DNA profiling has also been used to re-examine old evidence and solve previously unsolved crimes. To be relied upon, a DNA sample obtained from a crime scene must be properly collected. Current investigation techniques involving severe crimes include recovering DNA evidence and comparing the evidence with a sample of the suspect's DNA believed to be involved in the crime. In recent years, DNA profiling has only been used as a tool for solving more serious crimes, such as murder, rape, kidnapping, etc., and has not been widely deployed for all crime due to the time and costs involved.

Accordingly, what is desired is a crime investigation tool for entering, accessing and searching DNA information and related information to aid in investigations and solve crime. Further, what is desired is a remote interface in communication with a crime investigation tool adapted to store case related and DNA information, permit searching through stored records, link matching profiles, generate reports and provide mapping functions, all in real time. Further, what is desired is a secured-access investigation tool in communication with DNA labs and law enforcement officials, and wherein the tool is capable of evidence chain of custody tracking, among other functions.

SUMMARY OF THE INVENTION

An object of the present invention is to provide a crime investigation tool for tracking case status and DNA evidence to solve and link crimes.

Another object of the present invention is to provide a point of investigation tool for entering and accessing evidence from which a DNA profile can be obtained.

A further object of the invention is to provide an interface for accessing an investigation tool from the field and in real time for the purpose of uploading case information, entering specimen evidence, tracking case status, searching stored DNA profiles and receiving updates and reports.

A still further object of the invention is to provide a crime investigation tool utilizing DNA evidence to solve crime and generate reports.

A still further object of the invention is to provide an investigation tool for storing and incorporating exclusion samples.

A still further object of the invention is to provide an investigation tool for tracking evidence chain of custody.

A still further object of the invention is to provide an authorized-user investigation tool including an interface and database for organizing case and DNA-related information.

To achieve the foregoing and other objects and advantages, and in accordance with the purposes of the invention as embodied and broadly described herein, the present invention provides various embodiments of point of investigation tools and methods utilizing DNA evidence.

In one embodiment, the present invention provides an investigation tool utilizing DNA evidence including a database for receiving case- and specimen-related information, organizing the information, storing the information, running queries, finding matches, and generating communications and reports. The investigation tool is in communication with an on-site or remote interface operable for accessing the investigation tool, inputting information, performing searches and receiving reports, automatically or upon request from a user. The interface may be used in the field to enter case-related information, introduce specimen evidence for DNA analysis, track case status, and receive matching DNA profile reports, among other reports, in real time.

In one embodiment, the point of investigation tool includes a database including a memory, processor, software, server and interface for receiving, storing, sorting and communicating information. The information includes at least one of case details, specimen identification, specimen location, collection techniques, DNA profile, GPS coordinates, time, date, environmental conditions, photographs, video, witness statements, etc. The investigation tool provides real time access and updating, and is capable of generating and outputting "match" and "no match results," among other results, either automatically or upon demand.

In another embodiment, the present invention provides an investigation method whereby a user of the method, such as a law enforcement officer, is provided with an interface for accessing and entering information into an investigation tool, originating a case, entering specimen information related to the case and collection circumstances, tracking case history, viewing DNA profile matches, receiving reports and case updates, and tracking evidence chain of custody, among other functions. In a specific embodiment, DNA profiles matched with identification information are disconnected from the personal information.

In another embodiment, the present invention provides an investigation tool for putting case information in the hands of an officer in the field. Case, crime scene and evidence related information is entered and updated in real time and remotely. Evidence chain of custody is tracked from the officer to the lab and back to the officer. Entered information is batch processed to establish relationships between information. Relationships, such as matches found are reported to aid in investigations. Court reports may be generated linking multiple specimens with analyst conclusions. The investigation tool may further be adapted to generate maps detailing evidence collection locations and providing a link or dialog box to case related information.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
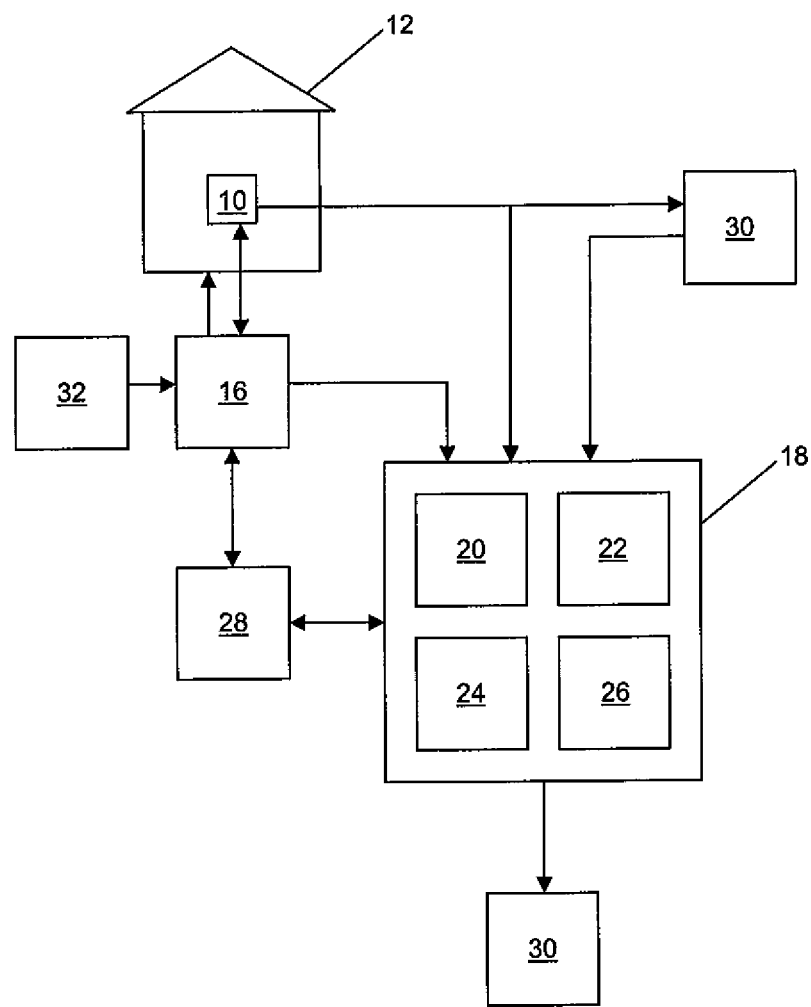
FIG. 1 is a schematic diagram illustrating an investigation system according to an embodiment of the invention.

Referring to FIG. 1, a schematic diagram illustrating investigation tool system architecture according to an embodiment of the present invention is shown. The system includes specimen evidence 10 collected from a crime scene 12 or other scene of interest. The evidence is entered and forwarded to a lab 14 for DNA analysis, where the lab 14 creates a DNA profile from the sample. The DNA profile and other information related to the evidence, such as sample information, collection techniques, testing procedures and lab information, is entered into an investigation tool 18 where it is stored, organized and matched against other profiles. The investigation tool 18 may be used to store case, crime scene, evidence information and DNA profiles on a local, regional, statewide, nationwide or global scale. The investigation tool 18 includes a server 20, memory 22, processor 24, and interface 26 for entering and viewing information. The investigation tool is preferably accessible through a secure site over the World Wide Web through a remote interface 28 with authorized access and password protection. Access may be granted, for example, to law enforcement officials or other authorized persons.

The system is further adapted to generate reports 30 and provide statistical information. Reports and statistical information may include, but is not limited to, DNA profile matches, numbers of crimes, types of crimes, timelines, trends, increases, decreases, geographic regions, etc. Information related to the crime scene and the evidence is linked with the DNA profile in the database as "related information" 16. Related information 16 may include, but is not limited to, specimen identification, collection techniques, type of crime, evidence and crime scene location, date, time, GPS coordinates, environmental conditions, photographs, video, witness statements, exclusion samples and any other information. The investigation tool 18 permits a user to create a new case in real time, enter information, update information, review case status, search cases, review previous case files and receive reports.

The remote interface 28 is operable for accessing the investigation tool 18, entering case and evidence information, viewing case status and receiving communications such as reports from the investigation tool, among other functions. The remote interface 28 may include a laptop, Blackberry® or similar device capable of sending and receiving data, such as through email. The remote interface allows an authorized user in the field to remotely access and update the investigation tool 18 in real time. Entered information may include case, crime scene and specimen information. The entered information is processed by the investigation tool 18 and relationships between cases and evidence established and reported to the remote interface 28 automatically or upon demand. "Hits" between DNA profiles are linked and provided to the remote interface 28. "Hits" are defined as matches found.

The investigation tool 18 further tracks evidence chain of custody. Specimen evidence "ownership" may be tied to the submitter, such as the submitting officer. Each officer or precinct may have a unique owner ID for accessing the investigation tool 18 and querying their results independent of the others. The investigation tool 18 works in cooperation with a lab capable of DNA analysis from specimen evidence. The investigation tool 18 may also work in cooperation with now known and hereinafter devised in-field DNA testing devices. Such devices are capable of analyzing a specimen in the field, such as from a suspect, and uploading the information to the investigation tool 18 for profiling and storing. From the specimen, a DNA profile is created that is matched against stored profiles. In the case of a match, an email or other report may be sent to the owners of matching profiles to alert them of the matching profile, which the information can then be used to aid in investigations. In other words, the investigation tool 18 reviews the database of DNA profiles as a new profile is entered and alerts, such as through email, recipients attached to that specimen and other matching specimens that the information has been entered and as DNA "hits" occur.

The investigation tool 18 further includes administrator areas for establishing email and other accounts, groups and tool maintenance. Additional reports may be produced by the system for detailing submitter performance with respect to collecting specimen evidence from which a usable DNA profile can be obtained. These reports may be used for training and evaluation purposes.

The investigation tool 18 incorporates auto entering of raw evidence information via electronic means and in that process retains the proper chain of custody. As stated above, entry can be done via an online interface that includes a means for entering all evidence information such as officer, case, location, condition, type, etc. about each item being sent to the lab, means of selecting predefined choices, such that querying and reporting can later be done effectively via these choices and means of entering evidence data to be used in conjunction with a test being done locally on site. Entry interface and/or accessioning may include producing labels (bar coded version) on all items previous to packing. Entry interface may include a shipping manifest of bulk evidence items (providing one step of the Chain of Custody). Specimens may be sent to a lab via an export function from an existing internal client or agency system. An agency system may then export files to the investigation tool 18, which may automatically accession batches of new evidence into the lab via the exported list. Automating the input of evidence/specimen data and automating the bulk output of reporting back to the agency is saves time and cost.

DNA profiles, crime scenes and geographic regions are searchable fields within the database, among other searchable fields. Once the identity of a DNA profile is known, the profile is preferably disconnected from its owner's personal information, such that the identity of a matching profile is only available through another level of access or upon contact from the database host. Upon being entered, DNA profiles are matched against stored profiles to provide a "match" or "no match" result and issue a report. The investigation tool 18 is capable of generating maps detailing the collecting site for the sample and providing links or drop-down menu for viewing related information, such as the date, time, etc. as stated above.

The investigation tool communicates a match/no match, referred to above as a "Hit." Crime scene information is linked with hits and provided to the investigators. Because of the disconnect from personal information, DNA loci and allele information is not compromised if the system were to be hacked. Further, the system operable for the low level loci to loci profile search is independent from the system that generates the interface. In one embodiment, the complete database portion may reside with the lab where loci searches allele by allele, and then a "Hit" is written into a specimen table for an item. A list may be generated linking specimen numbers to other specimen numbers, thus creating a list of specimen-to-specimen matches. The list is communicated to the investigation tool 18 where it can be viewed, information updated and searched through the remote interface 28. Thus, matches can be disconnected from DNA profile information.

Other enterable and searchable fields include, but are not limited to, specimen number, owner ID, item, case no., reference known or unknown, reference class, specimen class, result type, hit status, viewed status, case status, specimen description, collection date, lab date, hit date(s) and name. Reported information from the investigation tool 18 to the interface 28 may include, but is not limited to, specimen number, viewed, hit status, specimen owner ID, case no., item no., case status, specimen description, reference known or unknown, reference type, profile, evidence type, name, field collection, lab received date, hit date and map location.

Once the identity of the DNA owner is known, and as additional related information is discovered for that identity, that information may be entered and linked to the DNA profile. For example, if the owner of the DNA profile has been incarcerated, the date of incarceration and period of incarceration may be recorded. Other information, such as arrests, detained, deceased, etc. may be attached to the profile to provide further detailed information. This information may be used to establish timelines, release a suspect, verify an alibi, etc. in order to solve a crime. Further, officer DNA profiles may be entered for exclusion purposes.

The system may further include a device 32 for entering GPS coordinates, photos and videos. The functions of interface 28 and device 32 may be included into a single device. The device may further include a wired or wireless connection and dedicated hard or soft keys for accessing the investigation tool 18 and entering information.

Specimens preferably include viable and reliable material from which a DNA profile can be obtained by the lab. DNA may be collected from a sample of blood, saliva, hair, urine, semen, skin, bone, or any other fluid or body components capable of deriving a DNA profile therefrom.

Figure 2:
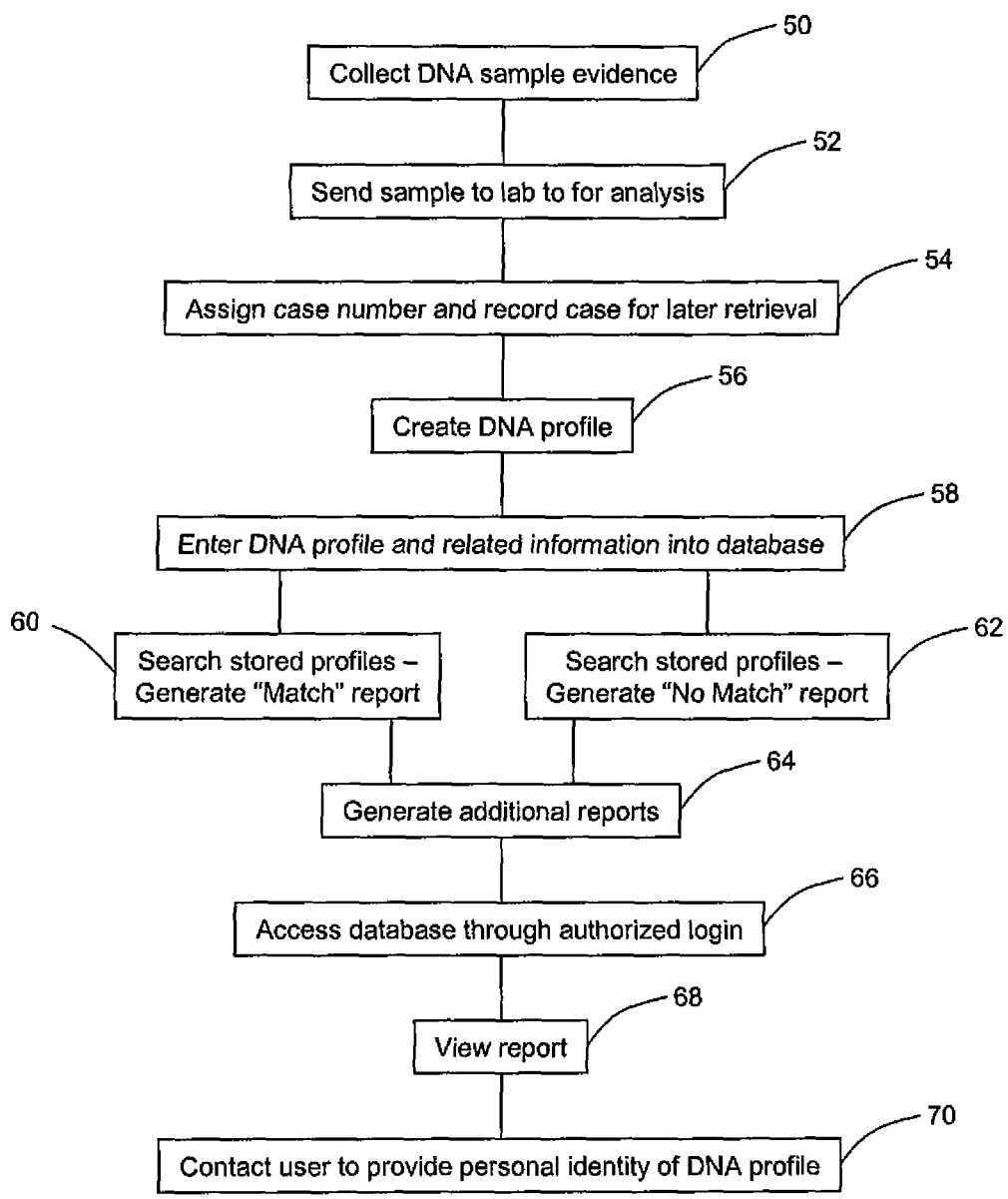
FIG. 2 is a flowchart illustrating a method for DNA identification according to an embodiment of the invention.

Referring to FIG. 2 a flowchart illustrating a method according to an embodiment of the present invention is shown. The method begins by first collecting evidence containing a DNA sample from which a DNA profile can be created 50. The sample is then sent to a lab for analysis and profiling 52. The sample submitters information is docketed to allow later inquiry and retrieval 54. For example, a submitted sample is assigned a reference number upon entry into the database, which is then searchable using that reference number. A DNA profile is created from the sample 56 and that profile, along with any related information, is then stored on the investigation database 58. The database stores the profile and matches it against stored profiles to produce a "match" 60 or "no match" 62 report. Other reports may be generated as well 64, such as statistical reports. A user accesses the database through a login screen that requests an authorized password 66. If the password is denied, the user is again asked for an authorized password. Once the password is accepted, the authorized user is provided with the "match" or "no match" report 68 which does not include the owner's identity. The identity is available through contact from the database host, through another level of access of by any other means 70. The user may also have the ability to enter or edit related information once logged in to the database.

The investigation tool 18 may also be responsible for generating passwords and providing training materials related to DNA evidence and collection procedures. Other statistical information may be generated as well, such as for educational purposes, including types of crimes committed in a predetermined region, number of total crimes, number of unsolved crimes, related crimes, etc. The existence of the database serves not only as a crime linking and solving tool, but as a deterrent to crime as well.

Figure 3:
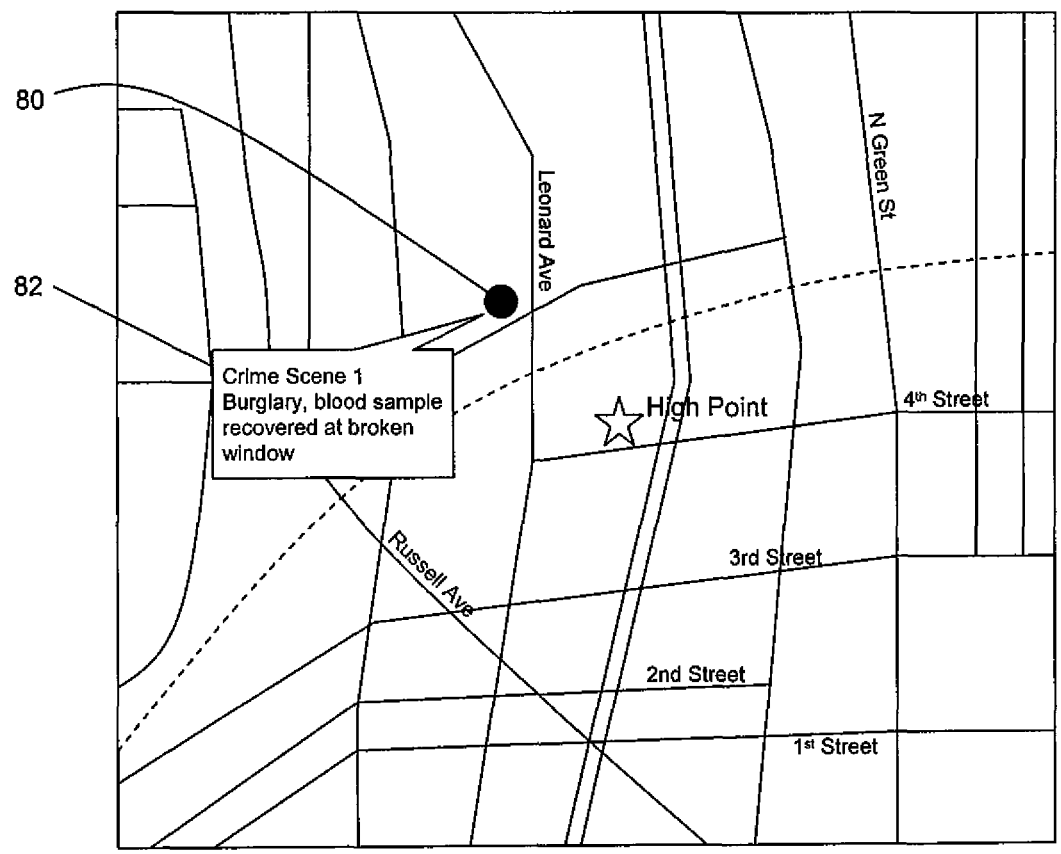
FIG. 3 is a map illustrating a first crime scene location and related information.
Figure 4:
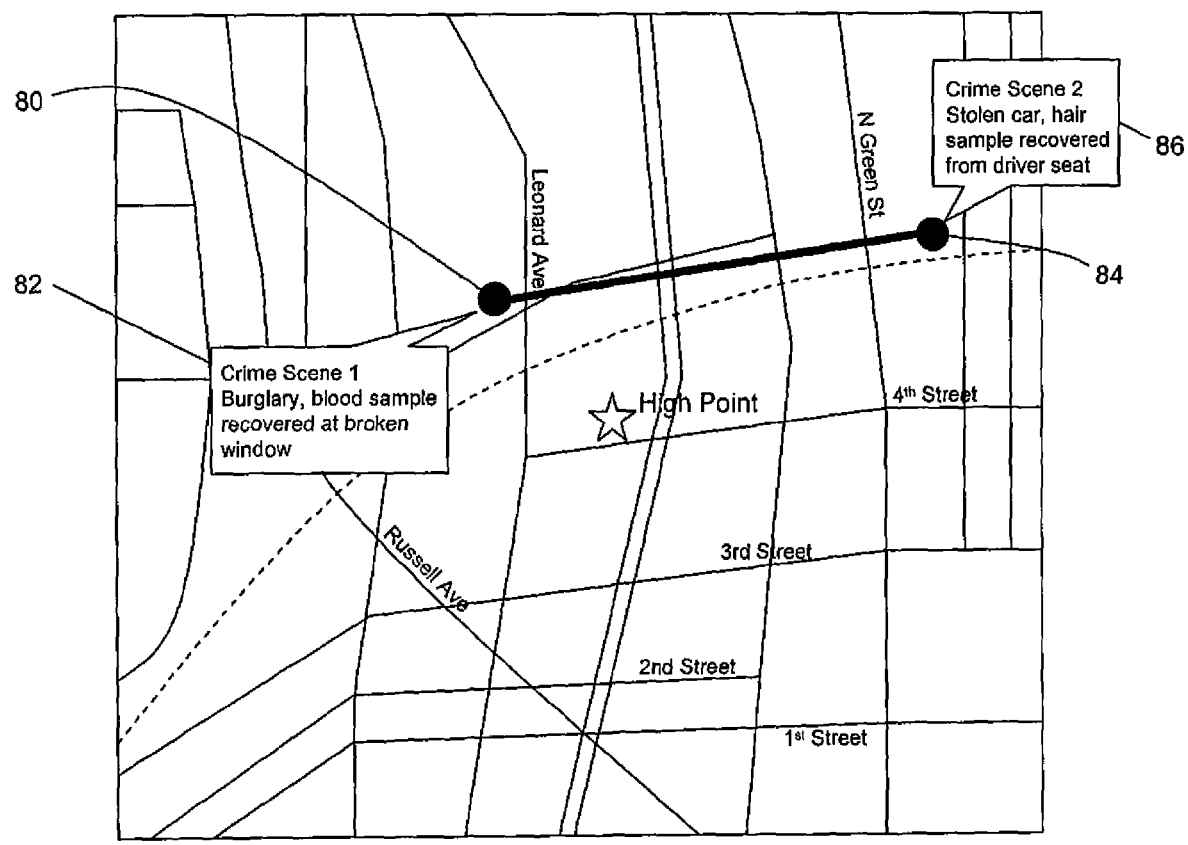
FIG. 4 is the map of FIG. 3 illustrating a second crime scene location and related information.
Figure 5:
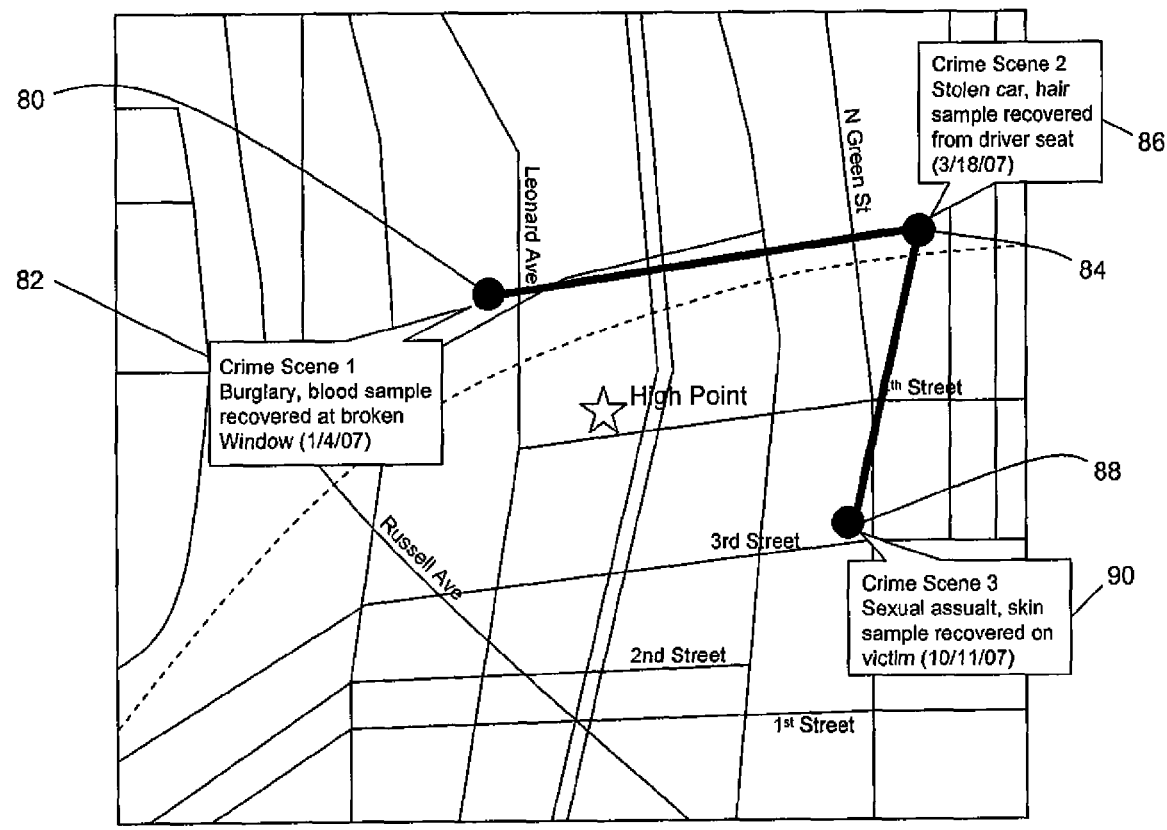
FIG. 5 is the map of FIG. 4 illustrating a third crime scene location and related information.
Figure 6:
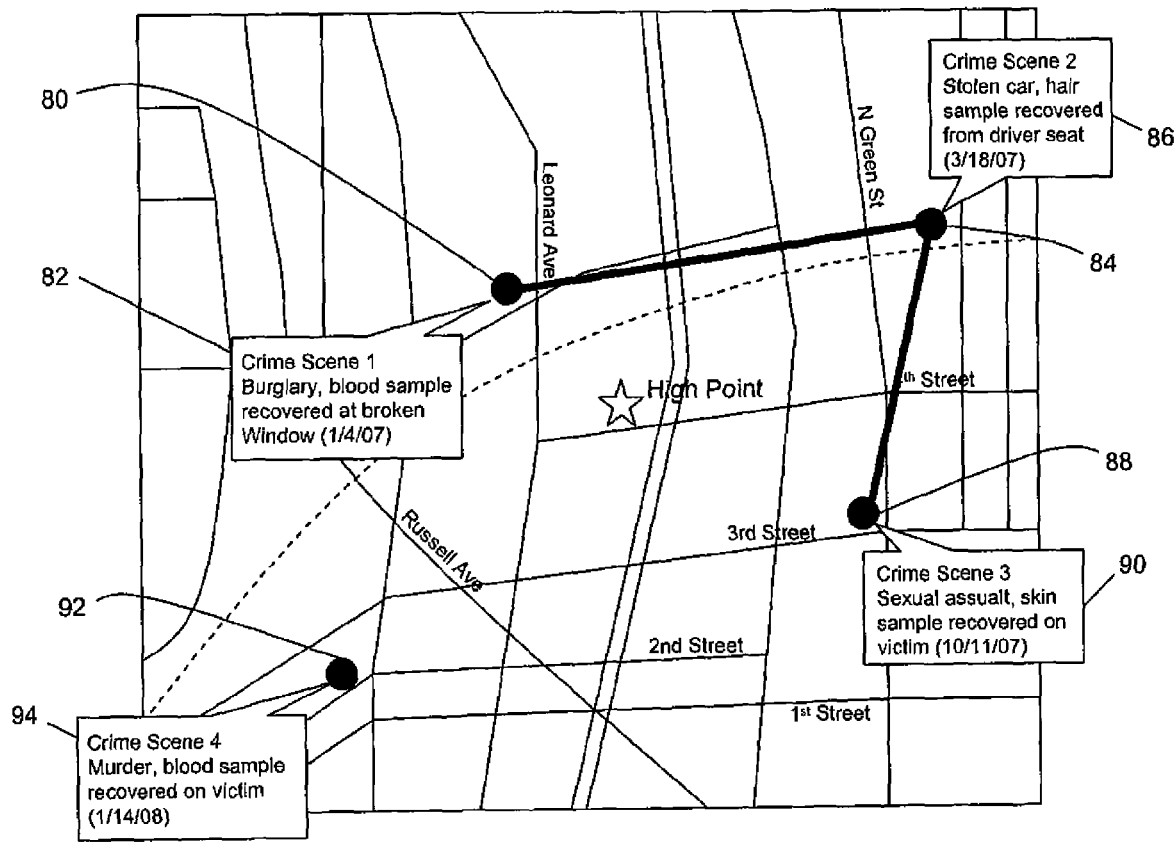
FIG. 6 is the map of FIG. 5 illustrating a fourth crime scene location and related information.

Referring to FIGS. 3-7, maps illustrating crime scene locations and related information are shown. The maps are preferably interactive and include GPS coordinates and drop-down boxes or links. FIG. 3 is a map of a geographic region including a first crime scene location 80. A detail box 82 including related information is attached to crime scene location 80. The related information includes the type of crime and evidence information, for example, burglary with blood spot evidence. The sample is submitted and a DNA profile created. The DNA profile may or may not match a stored profile in the database 18. FIG. 4 is a map of the same geographic region and including a second crime scene 84 at which a stolen car is found with hair sample collected reported in related information 86. The sample is submitted to the lab for a DNA profile and found to match the profile of crime scene 80, thus linking the crimes. FIG. 5 is a map of the same geographic region and including a third crime scene 88 at which a sexual assault occurred and a sample was collected as reported in related information 90. The sample is submitted to the lab for a DNA profile and found to match the profile of both crime scene 80 and 84. FIG. 6 is a map of the same geographic region and including a fourth crime scene 92 at which a murder occurred and a sample collected, as shown in related information 94. The DNA profile created from the sample from crime scene 92 was not matched with a stored profile, and thus not committed by the same profile as crime scenes 80, 84 and 88.

Figure 7:
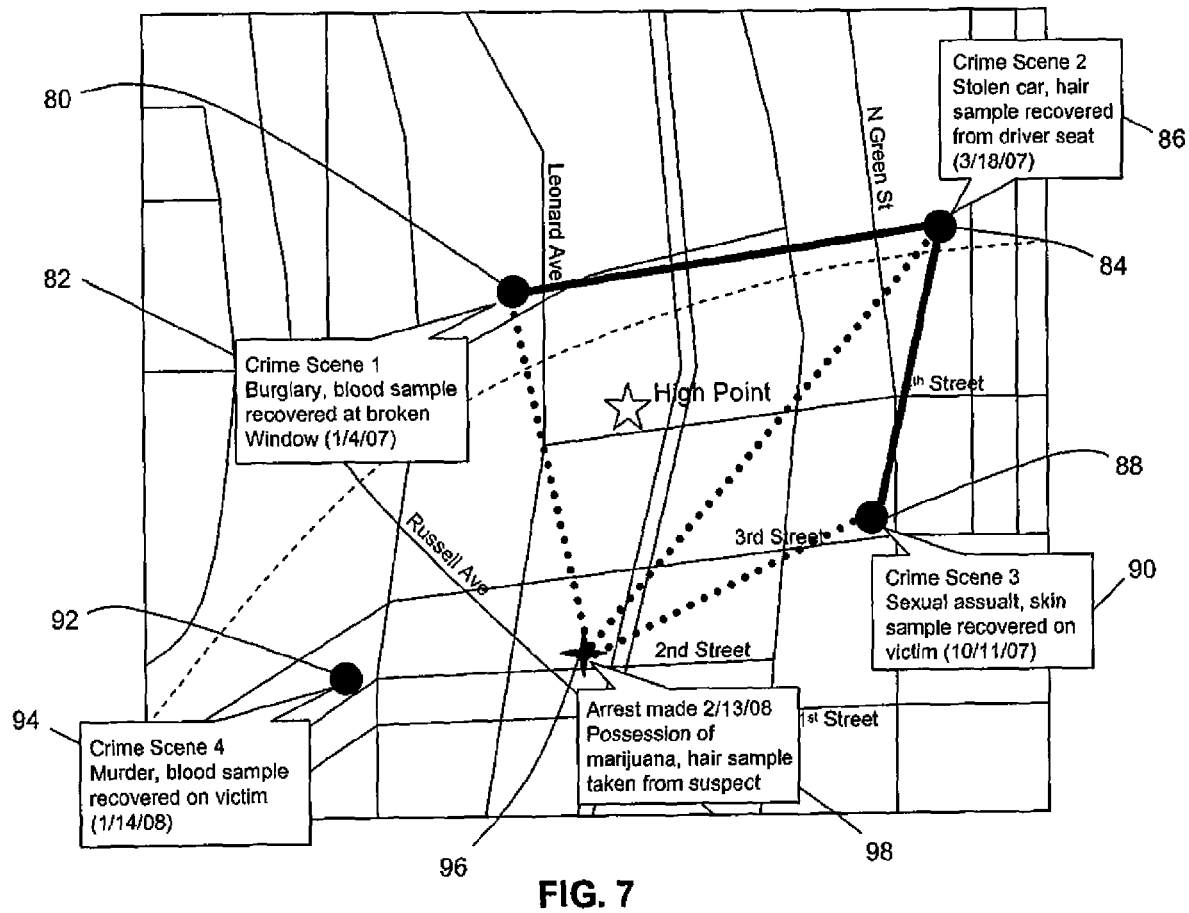
FIG. 7 is the map of FIG. 6 illustrating an arrest location and related information.

FIG. 7 is map of the same geographic region showing where a suspect was arrested at reference number 96 for possession of marijuana as detailed in related information box 98. A DNA sample is collected from the suspect and sent to the lab to create a DNA profile. The DNA profile is then entered into the database 18 and found to match the profile found at crime scenes 80, 84 and 88, thus linking the crimes. This evidence may be used to aid in solving the various crimes.

Evidence from any or all crimes in a given area may be entered into the investigation tool 18. As suspects are arrested and processed, for related or unrelated crimes, a DNA sample is collected from these persons and sent to the lab to obtain a DNA profile. The DNA profile is then entered into the investigation tool 18. The tool finds relationships between multiple evidence items and immediately links the evidence of old or new crimes to the newly entered profile. Thus, the DNA identification system primarily links crime scenes by the evidence collected.

The foregoing is a description of various embodiments of the invention that are given here by way of example only. Although crime investigation tools and methods including DNA evidence have been described with reference to specific embodiments thereof, other embodiments may perform similar functions and/or achieve similar results. Any and all such equivalent embodiments and examples are within the spirit and scope of the present invention and are intended to be covered by the appended claims.

What is claimed is:

1. A method utilizing a crime investigation tool in which the crime investigation tool is configured to compare at least one DNA profile corresponding to at least one evidentiary DNA sample from a crime scene against a database, maintained by a host, of profiles corresponding with previously collected and processed DNA samples, the method comprising the steps of:
    (a) acquiring directly from the host, which is a separate entity from a user accessing a host database, a first low level of access to the host database;
    (b) acquiring the at least one evidentiary DNA sample from the crime scene for analysis;
    (c) processing the at least one evidentiary DNA sample from the crime scene to obtain the at least one evidentiary DNA profile having information relating to variable lengths of repetitive DNA portions of the at least one evidentiary DNA sample;
    (d) applying the first low level of access in order to access the database and entering the at least one evidentiary DNA profile into the database;
    (e) acquiring an individual reference DNA sample for analysis, the individual reference DNA sample having identification information;
    (f) disconnecting the identification information from the individual reference DNA sample and securely storing the identification information separately and independently from the individual reference DNA sample to provide an anonymous DNA sample for unbiased processing, such that no direct linkage exists between identification information and the individual reference DNA sample and such that only the host has access to the existing identification information and only the host has the ability to reconnect the identification information to the individual reference DNA sample;
    (g) processing the anonymous DNA sample to obtain an anonymous DNA profile having information relating to variable lengths of repetitive DNA portions of the anonymous DNA sample;
    (h) entering the anonymous DNA profile into the database;
    (i) generating a scientific data report based on a comparison of the anonymous DNA profile to each of the at least one evidentiary DNA profile;
    (j) separating the scientific data report into a comprehensive data report and an abridged report, the abridged report containing summary information concerning a match between the anonymous DNA profile and the at least one evidentiary DNA profile stored in the database, and the comprehensive data report having at least one statistical information selected from the group consisting of types of crimes committed in a predetermined region, number of total crimes, number of unsolved crimes, and related crimes;
    (k) reporting the abridged report;
    (l) acquiring directly from the host a second level of access, that is higher and more secure than the first low level, so that access is available to the identification information which is separately and independently maintained by the host according to step (f);
    (m) applying the second level of access, reconnecting the identification information with the anonymous DNA profile of the anonymous DNA sample, and attaching the identification information to the abridged report; and
    (n) reporting the abridged report having the identification information attached; wherein:
    steps (a) through (n) are performed sequentially; and
    the summary information in the abridged report includes identification information having a subset of information related to the matching DNA profiles including at least one of an identity of the donor of DNA samples associated with the matching DNA profiles, information related to the donor, or information related to location, time or circumstances of obtaining the DNA samples corresponding to the matching DNA profiles.

2. The method of claim 1, wherein the variable lengths of repetitive DNA portions of the at least one evidentiary DNA sample from the crime scene and the variable lengths of repetitive DNA portions of the anonymous DNA sample correspond to each other.

3. The method claim 1, wherein the variable lengths of repetitive DNA portions of the at least one evidentiary DNA sample from the crime scene and the variable lengths of repetitive DNA portions of the anonymous DNA sample each comprise at least partial genotype information.

4. The method of claim 1, wherein match between the anonymous DNA profile and the at least one evidentiary DNA profile comprises a determination that the variable lengths of repetitive DNA portions of respective anonymous and evidentiary DNA profiles match each other.

5. The method of claim 4, wherein a match comprises a determination that the respective DNA profiles match each other within a predetermined margin of error.

6. The method of claim 1, wherein the summary information in the abridged report having the identification information reported in step (n) following the application of the second level of access to the database includes a subset of information related to the matching DNA profiles.

7. The method of claim 6, wherein the subset of information related to the matching DNA profiles includes an identity of a custodian of one or more DNA samples corresponding to the matching DNA profiles.

8. The method of claim 6, wherein the subset of information related to the matching DNA profiles includes an identity of a law enforcement official associated with the DNA samples corresponding to the matching DNA profiles.

9. The method of claim 6, wherein the subset of information related to the matching DNA profiles includes a map displaying locations associated with the DNA samples corresponding to the matching DNA profiles.

10. The method of claim 6, wherein the subset of information related to the at least one matching reference DNA sample includes a timeline having times associated with the DNA samples corresponding to the matching DNA profiles.

11. The method of claim 1, wherein reporting the abridged report comprises transmitting the abridged report via a network.

12. The method of claim 11, wherein transmitting the abridged report comprises emailing the abridged report to a user.

13. The method of claim 1, wherein reporting the abridged report comprises reporting a subset of information from the abridged report.

\* \* \* \* \*